Nov. 14, 1939. C. F. BLOOM Re. 21,259
DRIVE FOR ROD WEEDERS
Original Filed Sept. 29, 1937 2 Sheets-Sheet 1
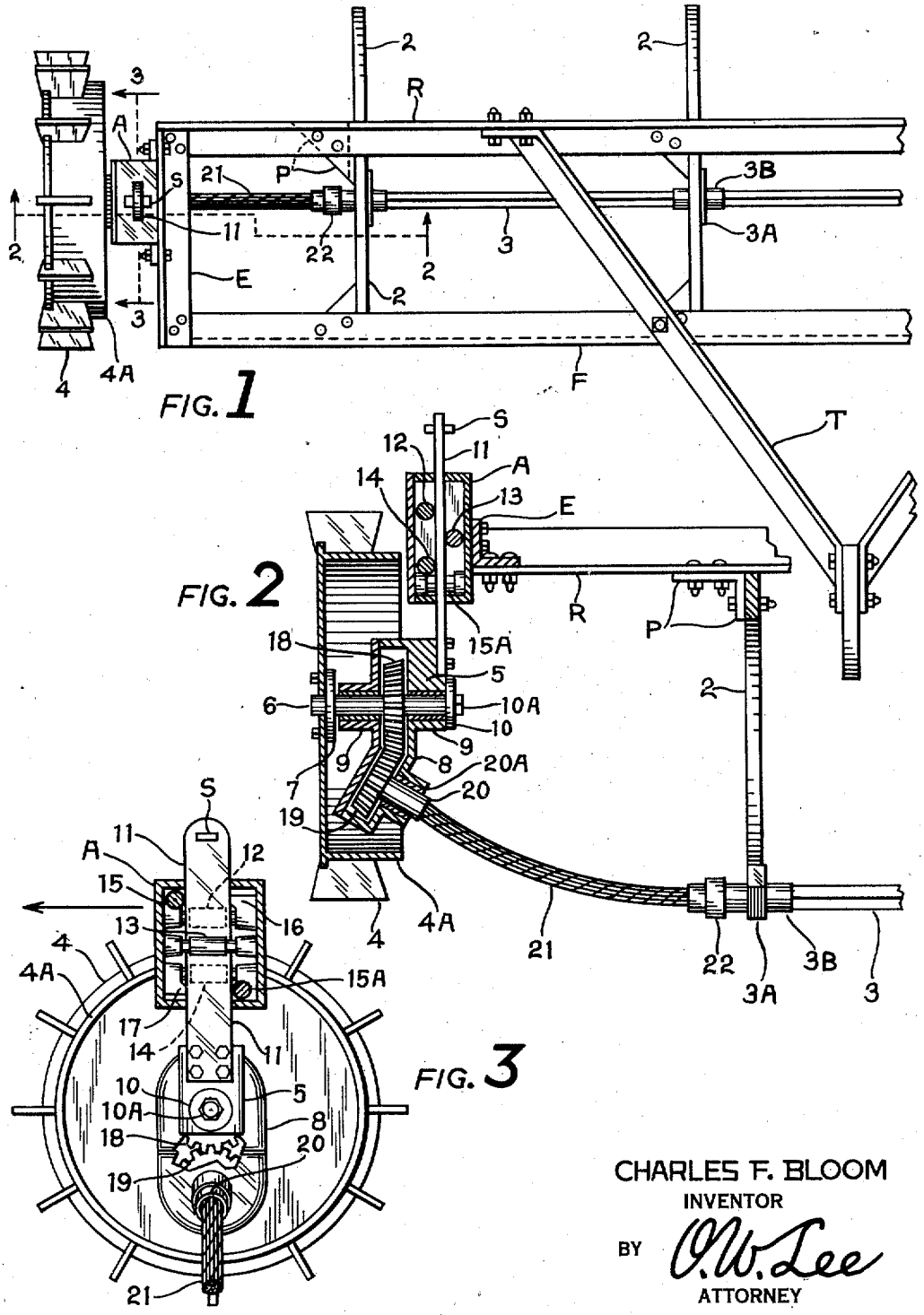
CHARLES F. BLOOM
INVENTOR
BY O. W. Lee
ATTORNEY Nov. 14, 1939. C. F. BLOOM Re. 21,259
DRIVE FOR ROD WEEDERS
Original Filed Sept. 29, 1937 2 Sheets-Sheet 2
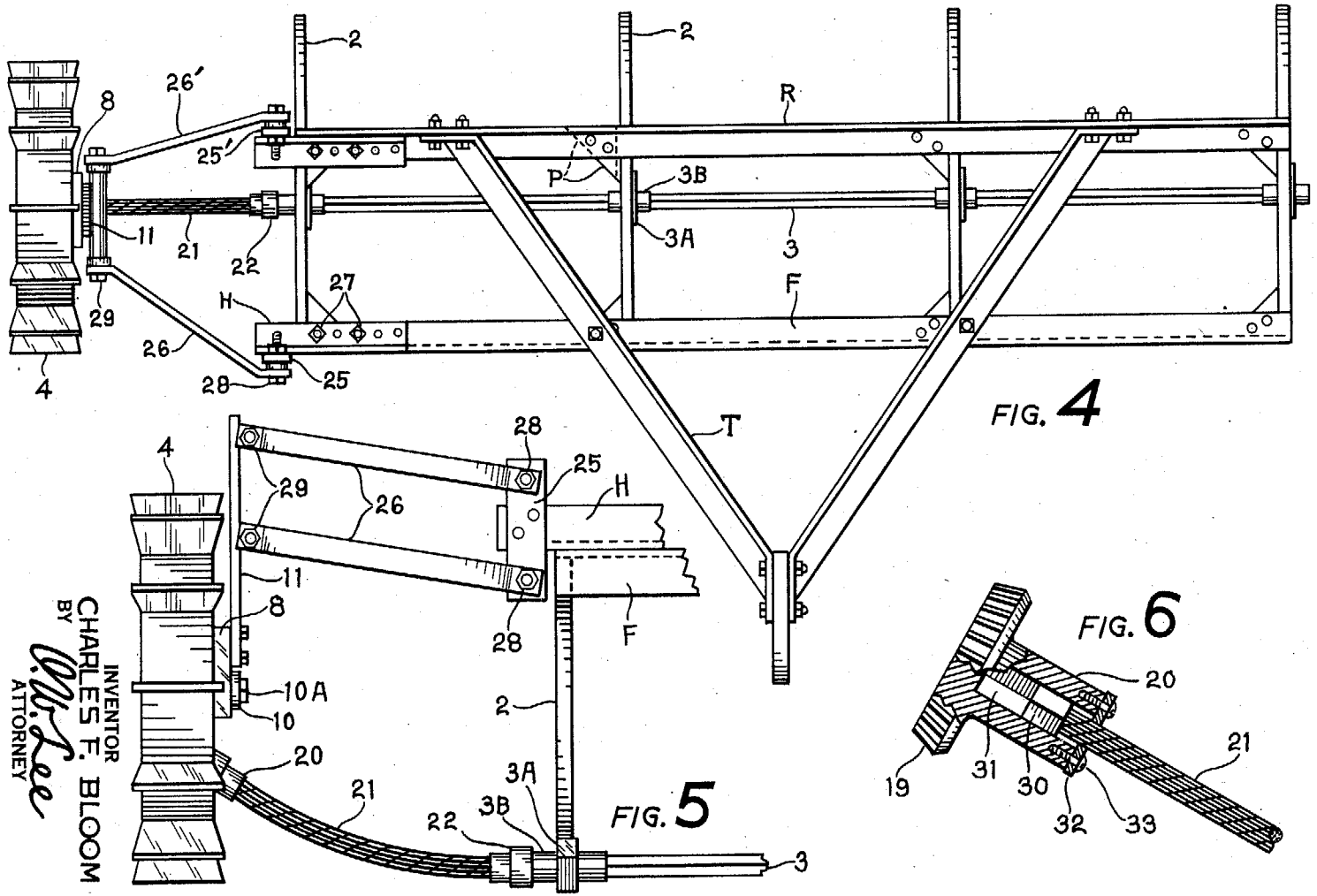
INVENTOR
CHARLES F. BLOOM
BY C. W. Lee
ATTORNEY Reissued Nov. 14, 1939

Re. 21,259

UNITED STATES PATENT OFFICE 21,259

DRIVE FOR ROD WEEDERS

Charles F. Bloom, Vancouver, Wash.

Original No. 2,135,382, dated November 1, 1938, Serial No. 166,401, September 29, 1937. Application for reissue August 16, 1939, Serial No. 290,421

12 Claims. (Cl. 97—42)

This invention relates to certain new and useful improvements in a drive for rod weeders of the end drive type, and is particularly directed to a floating drive wheel which is so mounted upon the weeder frame that it has free vertical movement relative to the frame and maintains a perpendicular relation to the frame during the vertical movements.

The required reverse drive movement is obtained by a pair of gears enclosed in an oil filled housing mounted within the floating drive wheel which shields the housing from entanglement with weeds, vines and other tares in which such machines are required to work; and the gears being entirely enclosed they are shielded from entanglement with such refuse and from the abrasive action of rocks and dirt, to which they would otherwise be subjected. The weeding rod is flexibly connected to the reversing gear by means of a drive cable so as to eliminate the necessity for universal joints which would otherwise be required were a tumbler shaft drive employed.

The tilting movements which are inherent to the floating drive wheels of the prior art, interfere with constancy of the traction and also objectionably scoop up considerable earth. These inaptitudes are corrected by my improved construction which maintains the drive wheel perpendicular to the weeder frame during the vertical movements.

By employing the flexible drive cable I provide greater freedom for vertical movement of the drive wheel and also eliminate the necessity for universal joints which are quite likely to become entangled with weeds and vines during the operation of the machine, and are also subject to excessive wear by the abrasive elements in the earth, particularly on the lower universal joint which must by necessity operate under the ground.

With my improved construction, the drive wheel is free to rise and fall independent of the weeder frame, and therefore the weeding rod remains at constant depth unaffected by the vertical movements of the drive wheel. Also, the floating drive wheel will inherently follow any depression in the ground and provide constant traction for driving the weeding rod, in contradistinction to the weeding rod supporting the drive wheel over such depressions with the consequent loss of traction for driving the weeding rod.

The accompanying drawings illustrate two modes for carrying my invention into practice.

Figure 1 is a fragmentary plan view of a weeder embodying one form of my invention.

Figure 2 is an enlarged sectional view, taken on line 2—2 of Figure 1.

Figure 3 is an enlarged sectional view taken on line 3—3 of Figure 1, a part of the casing being broken away to disclose the gears.

Figure 4 is a plan view of a weeder embodying the preferred form of my invention.

Figure 5 is an enlarged front view of the drive wheel mechanism shown in Figure 4.

Figure 6 is an enlarged sectional detail showing the slidable engagement of the drive cable within the reversing gear.

In the practical application of the invention, the weeder itself may be of any suitable construction. For the purpose of illustration, the weeder frame is shown with a front rail F and a rear rail R, on the underside of which the well known goose necks 2 are rigidly secured by means of tie plates P. The weeding rod 3 is provided with journal bearings 3B which are rotatably mounted in the shoes 3A which are fixed to the goose necks 2. A suitable draft tongue such as T is attached to the frame.

As shown in Fig. 2 and Fig. 3, my improved drive comprises a gear housing 8 provided with a pair of axially aligned bearings 9—9 which support the journal ends of a stub axle 6 which has a drive gear 18 fixed thereto. This drive gear 18 meshes with a reversing gear 19 which has a hub 20 journaled in a bearing 20A in the housing 8. Fixed to the axle 6 is a head 7 to which the drive wheel 4 is securely bolted with its rim 4A overhanging the housing 8. Exteriorly of the housing, a cap plate 10 is secured to the end of the axle 6 by a cap screw 10A so as to limit end play of the axle 6.

The housing 8 is reinforced at 5 and a flat slide bar 11 is securely bolted to this reinforced part of the housing. This flat slide bar 11 passes vertically through the guide casing A which is securely bolted to the end of the weeder frame; in the present instance, an end rail E is shown for that purpose. Free vertical movement of this slide bar is enhanced by a number of guide rollers journaled in the guide casing A. The upper roller 12 and the lower roller 14 bear against one of the flat sides of this slide bar and an intermediate roller 13 bears against the opposite flat side. A top roller 15 bears against the front edge of the slide bar and a bottom roller 15A bears against the rear edge theroef. These rollers 15 and 15A take the stress of the back force upon the drive wheel 4 when the weeder is pulled in the direction of the arrow shown in Fig. 3. As the weeder is never operated in the opposite direction, the slidable engagement of the slide bar within its guide casing suffices for the usual requirements, but if further support is desired, it is conveniently practical to extend the bearing bosses as shown at 16 and 17 to contact the respective edges of the slide bar. A suitable stop such as S may be provided to limit the downward movement of the slide bar 11.

With this improved construction, the drive wheel and the gear housing are vertically movable relative to the weeder frame with but slight resistance, and the drive wheel is maintained perpendicular to the weeder frame during these vertical movements.

A suitable length of drive cable 21 is secured to the end of the weeding rod as indicated at 22, and the opposite end of this cable is connected to the reversing gear 19 so as to turn therewith. This provides for the weeding rod to be turned opposite to the rotation of the drive wheel 4, which reverse rotation is a prime requisite in rotary rod weeders.

In Fig. 4 and Fig. 5 the described guide casing is supplanted by two converging pairs of parallel bars 26 and 26' which are pivoted to the bar 11 and to the weeder frame so as to provide for vertical movement of the drive wheel 4 and maintain it perpendicular to the weeder frame during the vertical movements.

The front pair of parallel bars 26—26 are pivoted to the upright bar 11 by means of the bolts 29 and 29 which are vertically spaced apart a suitable distance; the bolts 28 and 28 are vertically spaced apart this same distance and pivotly connect the other ends of the bars 26—26 to the upright bracket 25 which is rigid with a horizontal tail piece H which is bolted to the front rail F of the weeder frame as indicated at 27. The rear pair of parallel bars 26' are pivoted in this same manner and their bracket 25' is fixed to the rear rail R of the weeder frame.

From this description it will be seen that the drive wheel 4 is vertically movable relative to the weeder frame and is maintained perpendicular to the weeder frame during the vertical movements. The two pairs of parallel bars converge towards the drive wheel 4 and afford a more adequate brace effect than if the two pairs were parallel to each other.

The described parallel bar construction is such that it can be assembled on either end of a weeder frame and the drive cable connected to the weeding rod in the described manner. When two end drive weeders are hitched together it is necessary that one have the drive wheel at the left end and the other have the drive wheel at the right end, and it will be seen that this form of my invention provides this important requisite by mere difference in assembly and without the expense of dual manufacturing of both left and right end drives.

Fig. 6 shows an enlarged sectional detail of the preferred mode of mounting the drive cable 21 to turn with the reversing gear 19. As here shown, the hub 20 is provided with a square channel 31, and the drive cable 21 is provided with a square head 30 which is slidably mounted in the channel 31 and retained therein by a keeper plate 32 secured to the hub 20 by screws 33—33. This structure provides for longitudinal movement of the drive cable 21 within the hub 20 and enhances the range of rise of the drive wheel 4 for a given length of drive cable.

In operation, my improved drive is secured to one end of the weeder, and it will be understood that the opposite end of the weeder does not require a carriage wheel; however, if desired, the well known transport wheels of the prior art may be mounted at the rear of the frame with suitable means for raising and lowering them according to the common practice. As the weeder is drawn over the ground, the weeding rod sinks below the surface, unimpeded by the drive wheel, and will operate at a uniform depth uninfluenced by the rise of the drive wheel in negotiating elevations in the path of travel. The traction of the drive wheel is constant at all times, irrespective of elevations and depressions in the path of travel. The floating movements of the drive wheel and drive cable, materially assist in freeing refuse from lodgement between these parts and the weeder, and it will also be noted that the improved construction provides ample clearance space for the escape of such refuse which is a constant problem in rod weeder operation.

I claim as my invention:

1. In a weeder embodying a frame with downwardly projecting members having a weeding rod rotatably mounted therein; a rotatably mounted drive wheel, means for floatingly mounting said wheel at one end of said frame, said means maintaining said wheel in constant perpendicular relation with said frame during the floating movements of said wheel, and a drive means operatively connecting said weeding rod to said drive wheel and turning said weeding rod opposite to the rotation of said drive wheel.

2. In a weeder embodying a frame with downwardly projecting members having a weeding rod rotatably mounted therein; a rotatably mounted drive wheel, a drive gear turned by said wheel, a reversing gear meshing with said drive gear, means for floatingly mounting said wheel and said gears at one end of said frame, said means maintaining said wheel in constant perpendicular relation with said frame during the floating movements of said wheel, a drive cable turned by said reversing gear and fixed to said weeding rod for turning the same opposite to the rotation of said drive wheel.

3. In a weeder embodying a frame with downwardly projecting members having a weeding rod rotatably mounted therein; a rotatably mounted drive wheel, a drive gear turned by said wheel, a reversing gear meshing with said drive gear, means for floatingly mounting said wheel and said gears at one end of said frame, said means maintaining said wheel in constant perpendicular relation with said frame during the floating movements of said wheel, and a drive cable turned by said reversing gear and fixed to said weeding rod for turning the same opposite to the rotation of said wheel, said drive cable being slidably engaged with said reversing gear so as to enhance the range of floating movement of said drive wheel.

4. A drive for a rod weeder comprising a housing, an axle mounted in the housing, a drive wheel upon said axle, a drive gear within said housing and turned by said wheel, a reversing gear within said housing and meshing with said drive gear, a hub upon said reversing gear, said hub extending exteriorly of the housing to receive a drive connection from a weeding rod, and means for floatingly mounting said housing at one end of a weeder frame and maintaining said wheel in constant perpendicular relation with such weeder frame during the floating movements of said housing.

5. A drive for a rod weeder comprising a rotatably mounted drive wheel, means for floatingly mounting said wheel at one end of a weeder frame and maintaining said wheel in constant perpendicular relation with such frame during the floating movements, a drive gear turned by said wheel, a reversing gear turned by said drive gear, and a hub upon said reversing gear for receiving a drive connection from a weeding rod for turning the latter in a direction opposite to the rotation of said drive wheel.

6. A drive for a rod weeder comprising a rotatably mounted drive wheel, means for floatingly mounting said wheel at one end of a weeder frame and maintaining said wheel in constant perpendicular relation with such frame during the floating movements, a drive gear turned by said wheel, a reversing gear turned by said drive gear, and a drive cable extending from said reversing gear for attachment to a weeding rod for driving the same in a direction opposite to the rotation of said drive wheel.

7. A drive for a rod weeder comprising a rotatably mounted drive wheel, a drive gear turned by said drive wheel, a reversing gear meshing with said drive gear, a drive cable turned by said reversing gear and slidably mounted therein, and means for floatingly mounting all of said parts at one end of a weeder frame, said means maintaining said drive wheel in constant perpendicular relation with such weeder frame during the floating movements of said wheel.

8. A drive for a rod weeder comprising a housing, an axle mounted in the housing, a drive wheel upon said axle, said drive wheel having a rim extending over said housing, a drive gear within said housing and turned by said wheel, a reversing gear within said housing and meshing with said drive gear, a hub upon said reversing gear, said hub extending exteriorly of the housing to receive a drive connection from a weeding rod, and means for floatingly mounting said housing at one end of a weeder frame and maintaining said wheel in constant perpendicular relation with such weeder frame during the floating movements of said housing.

9. A drive for a rod weeder comprising a housing, an axle mounted in said housing, a drive wheel upon said axle, a drive gear within said housing and turned by said wheel, a reversing gear within said housing and meshing with said drive gear, a hub upon said reversing gear, said hub extending exteriorly of the housing to receive a drive connection from a weeding rod, a guide casing for attachment to a weeder frame, a slide bar rising from said housing and passing vertically through said guide casing, and rollers journaled in said casing and in contact with said slide bar.

10. A drive for a rod weeder comprising a guide casing for attachment to the end of a weeder frame, a slide bar passing vertically through said guide casing, guide rollers journaled within said casing and in contact with said slide bar, a stub axle carried by said slide bar, a drive wheel upon said axle, a drive gear turned by said wheel, a reversing gear meshing with said drive gear, and a hub upon said reversing gear for receiving a drive connection from a weeding rod.

11. A drive for a rod weeder comprising a stub axle, an upright slide bar rising from said axle, means for slidably mounting said slide bar at one end of a weeder frame, a drive wheel upon said axle, a drive gear turned by said wheel, a reversing gear meshing with said drive gear, and a hub upon said reversing gear for receiving a drive connection from a weeding rod.

12. In a weeder embodying a frame with downwardly projecting members having a weeding rod rotatably mounted therein; a stub axle floatingly connected to one end of said frame by means of parallel bars pivotally mounted at their inner and outer ends, a drive wheel upon said axle, and a drive means operatively connecting said weeding rod to said drive wheel and turning said weeding rod opposite to the rotation of said drive wheel.

CHARLES F. BLOOM.